Figure 1:
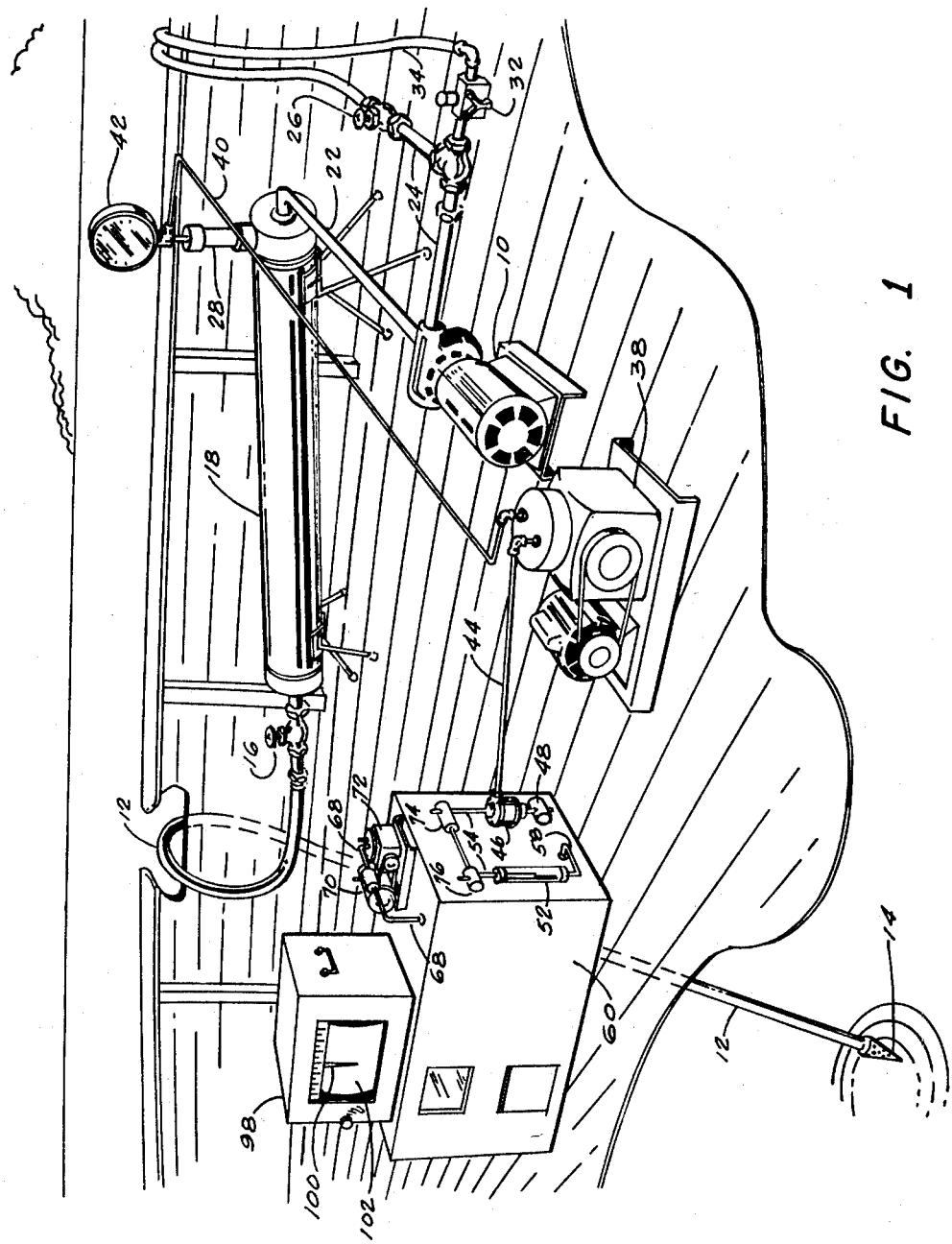

INVENTORS
ROBERT L. SLOBOD
HENRY F. DUNLAP
THOMAS F. MOORE
BY:
ATTORNEY

United States Patent Office 2,918,579
Patented Dec. 22, 1959

2,918,579

EXPLORATION FOR PETROLIFEROUS DEPOSITS BY LOCATING OIL OR GAS SEEPS

Robert L. Slobod, State College, Pa., and Henry F. Dunlap and Thomas F. Moore, Dallas, Tex., assignors to The Atlantic Refining Company, Philadelphia, Pa., a corporation of Pennsylvania Application January 31, 1957, Serial No. 637,473

20 Claims. (Cl. 250—43.5)

The present invention relates to a method of an apparatus for exploring for petroliferous deposits. More particularly, the present invention relates to a method of and apparatus for locating subterranean petroliferous deposits in water-covered areas. In a still more specific aspect, the present invention relates to a method of and apparatus for locating seeps from subterranean petroliferous deposits in water-covered areas.

In exploration for subterranean petroliferous deposits, various methods have heretofore been practiced at the earth's surface. These present-day methods can be broken down into the following general categories: seismic methods for locating and outlining subsurface formations which exhibit characteristics similar to hydrocarbon-bearing formations or which are possible continuations of known hydrocarbon-bearing formations; the surface measurement of certain physical or physico-chemical phenomena, such as, gravimetric, magnetic or radioactive properties, which are generally associated with hydrocarbon-bearing formations; and the detection or measurement, at the earth's surface, of certain elements or compounds resulting from one or more constituents of a petroliferous deposit seeping to the surface of the earth. In spite of the fact that the third of these enumerated methods relies upon a constituent of a subsurface petroliferous deposit as an indicator while the first and second methods are based on indirect indicators of subsurface formations which may or may not contain petroliferous deposits, only the seismic, magnetic and gravimetric methods have been applied in water-covered areas, such as, navigable bays, gulfs and the like, and no one has heretofore suggested seep location as a means of exploration in such areas. This failure to practice the most direct method of exploration, i.e., seep location, in water-covered areas is probably due primarily to certain inherent limitations in present-day methods of seep detection on land which will be evident from the following brief discussion of present-day seep detection methods.

It is known, for example, that methane, ethane or other constituents of subsurface petroliferous deposits sometimes seep to the surface of the earth. Although the mechanism of such seepage or migration is not definitely known and various explanations have been advanced, it is believed that such constituents seep to the surface along a fault line or other fracture path. In any event, statistical correlations of producing reservoirs with seeps show that seeps are extremely valuable indicators of subsurface petroliferous deposits. In fact, many valuable oil fields have been located by drilling on seeps, particularly in the early days of the industry. However, the locating of these seeps has depended on visual observation of gas or oil bubbling through water in most cases, and no reliable instrumental means of locating seeps in a systematic manner has existed. For example, present-day methods of geochemical exploration would be very inefficient if employed to locate seeps. In these methods, samples of soil gas or soil from which is gas is subsequently extracted are systematically collected in the area of interest; and the extracted gas is analyzed for a preselected constituent. Since soil sampling or extraction of gas from the soil forms the basis of these methods, comparatively complicated equipment must be employed to obtain a representative sample; and such sampling would have to be carried out at closely spaced intervals to avoid missing a seep. Accordingly, these methods would be expensive, prone to inaccuracy, time-consuming, limited in coverage to extremely small areas, and definitely not adaptable to continuous operation.

Accordingly, it is an object of the present invention to provide an improved method and apparatus for exploring for petroliferous deposits.

Another object of the present invention is to provide an improved method and apparatus for exploring for petroliferous deposits in water-covered areas.

Still another object of the present invention is to provide an improved method and apparatus for locating seeps from subterranean petroliferous deposits.

Another and further object of the present invention is to provide an improved method and apparatus for locating seeps from subterranean petroliferous deposits which can be carried out in a continuous manner.

A still further object of the present invention is to provide an improved method and apparatus for locating seeps from subterranean petroliferous deposits by surveying navigable, water-covered areas.

Still another object of the present invention is to provide an improved method and apparatus for locating seeps from subterranean petroliferous deposits wherein methane is employed as an indicator.

Other and further objects of the instant invention will be apparent from the following detailed description of the present invention.

In accordance with the instant invention, it has been found that seep gases, such as methane or other higher molecular weight normally gaseous hydrocarbons sometimes migrate to the earth's surface in quantities sufficient to indicate the presence of hydrocarbon-bearing, subsurface formations and may be found dissolved in various water sources in significant quantities. Accordingly, the present invention employs the dissolved hydrocarbon gas content of water as an indicator of the presence of hydrocarbon-bearing, subsurface formations by obtaining a sample of the water to be analyzed, passing such sample through a separator adapted to break the gas out of the solution and separate it from the water and then analyzing the separated gas for a preselected component.

The present invention is described hereinafter in connection with the preferred method and apparatus for exploration in navigable, water-covered areas. However, it is to be understood that various modifications of the present method and apparatus and various subcombinations of the apparatus of this invention may be employed in exploration methods wherein the water samples are obtained from non-navigable, surface waters, waters collected from the surface water table and waters collected from various subsurface formations.

Figure 2:
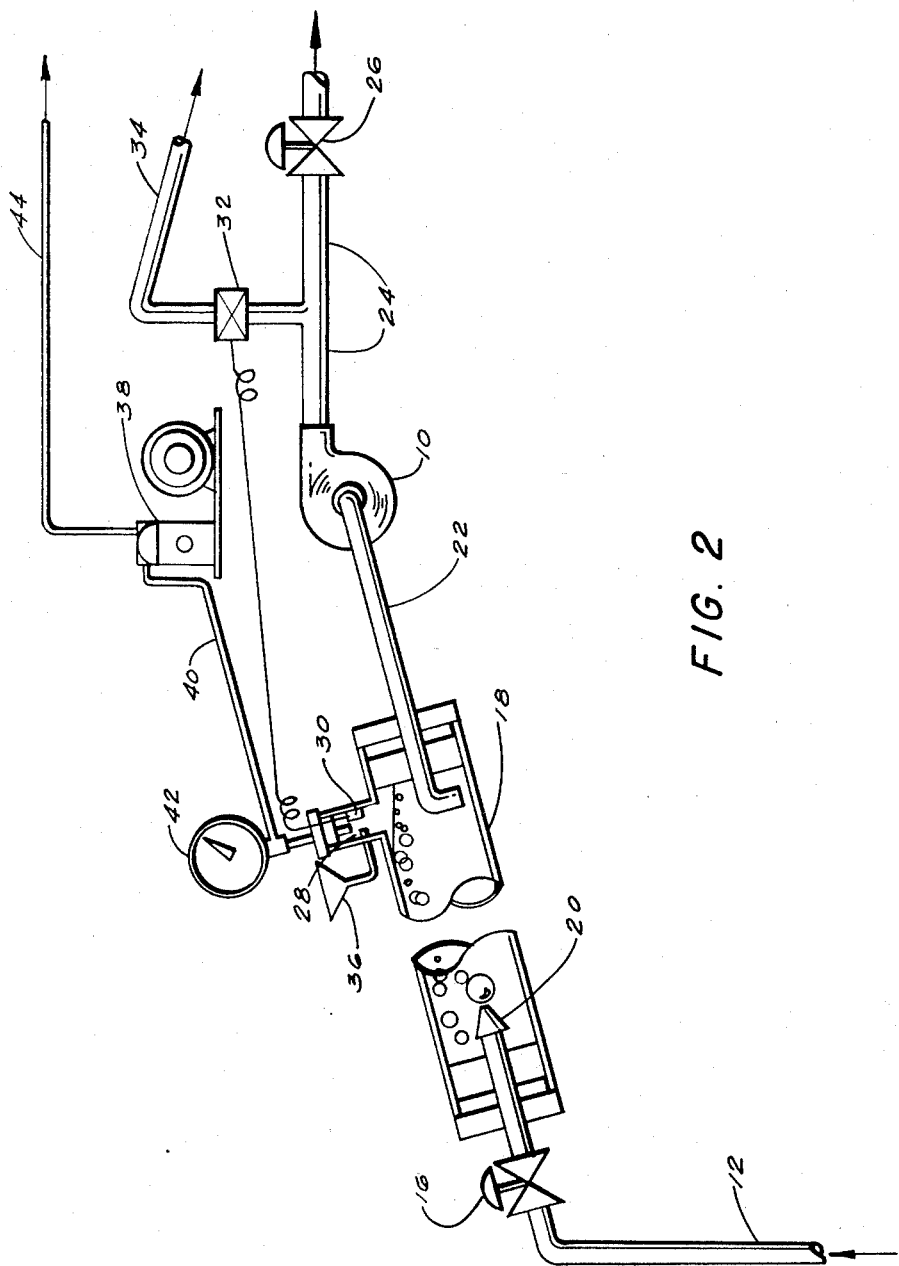
Figure 3:
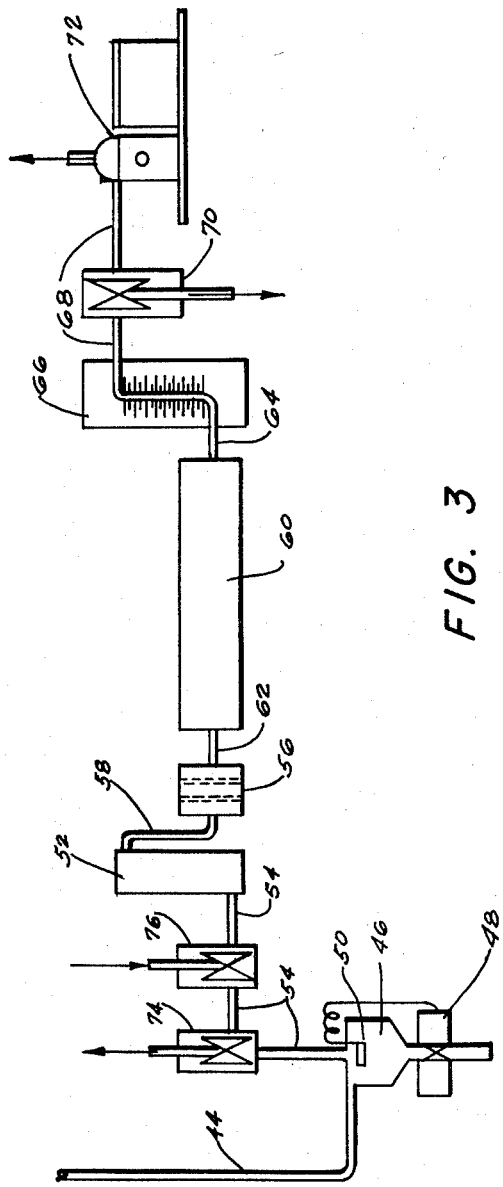
Figure 4:
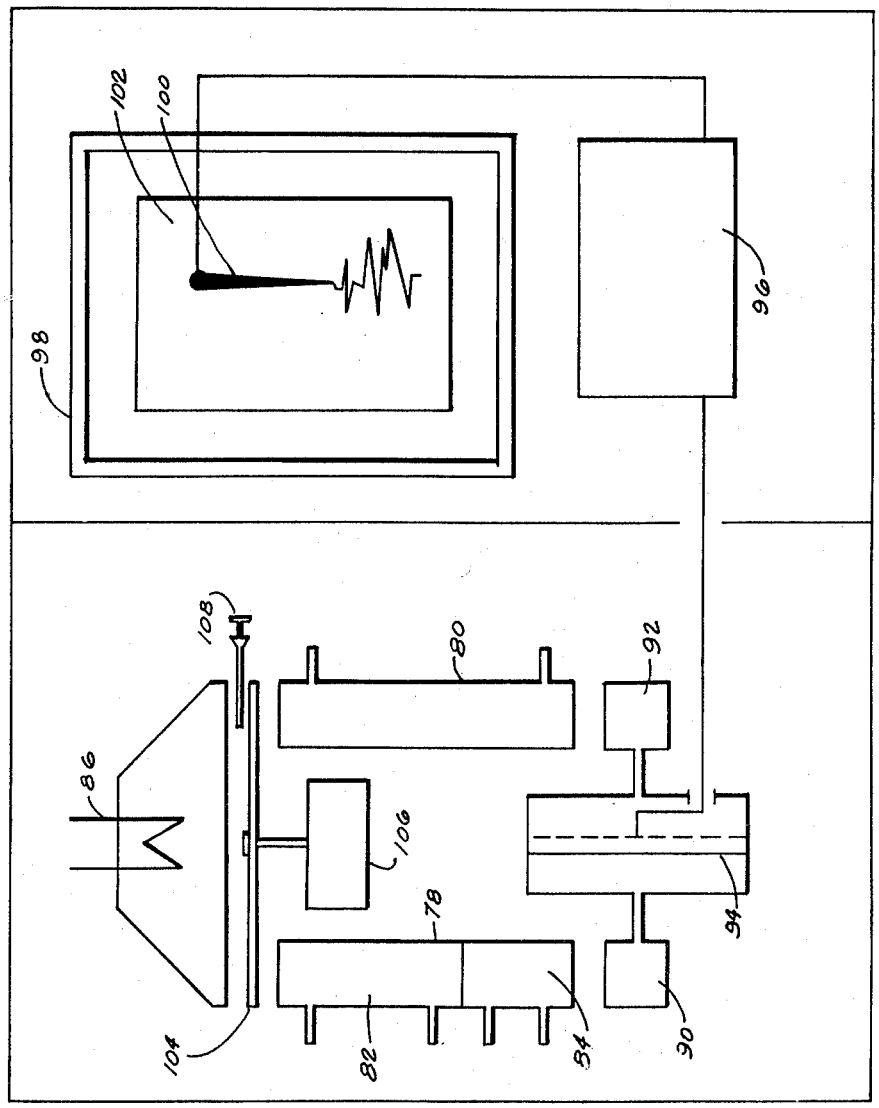
Figure 5:
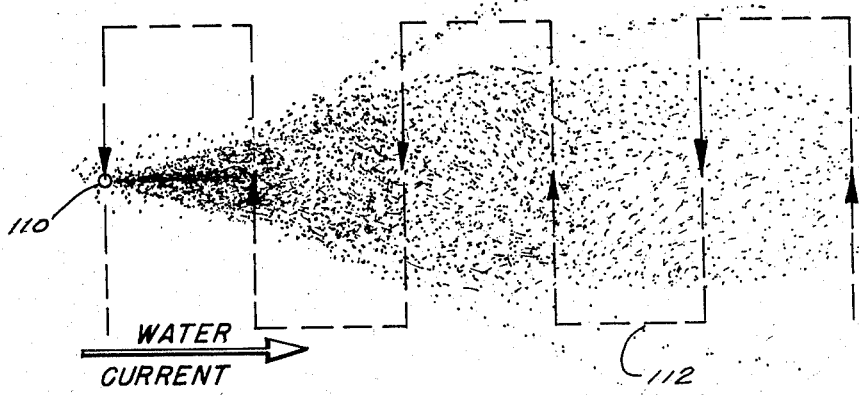
Figure 6:
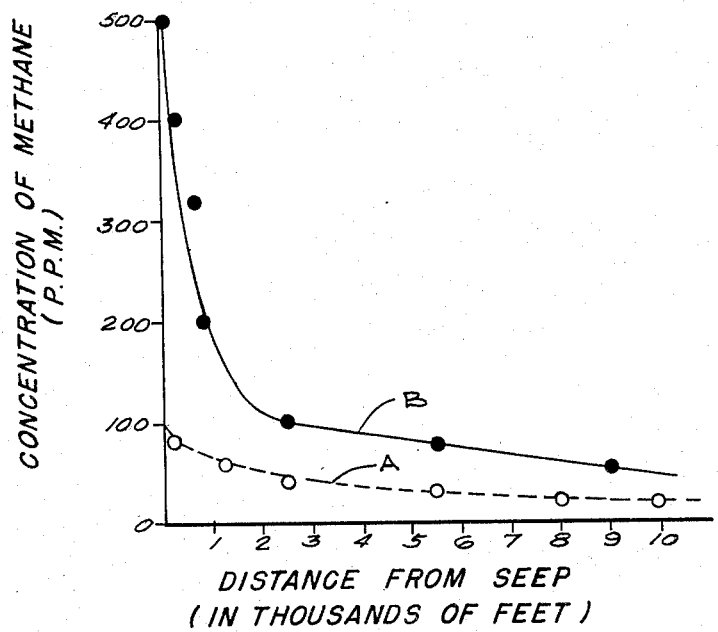

Referring to the accompanying drawings:

Figure 1 illustrates the novel combination of apparati of this invention mounted on a vessel for continuous exploration in navigable areas, Figure 2 shows the novel subcombination of apparati for desorbing dissolved gas from water in accordance with the present invention, Figure 3 illustrates the novel subcombination of apparati for treating and analyzing the gas evolved by the apparatus of Figure 2, Figure 4 shows a conventional infrared analyzer of the non-dispersive type which is the analyzer found most desirable to successfully practice the method of this invention, Figure 5 shows the distribution of dissolved hydrocarbon gas found to exist adjacent a gas seep and the best method of continuously surveying the area of the seep, and Figure 6 is a graphical representation of the data obtained by continuously surveying an area having a large gas seep compared to an area containing a small gas seep.

As a result of extensive experimentation and use of the present method of seep location, it has been found that gas migrating from hydrocarbon-bearing, subsurface formations will dissolve in overlaying water as it bubbles upwardly through the water and be distributed in the water parallel to the prevailing current to effect a plume-type distribution much the same as smoke from a smokestack is distributed in the air by air currents. Obviously, as the distance from the seep increases in the direction of travel of the prevailing current, the gas content of the water will decrease and will be smallest at the broad end of the plume and eventually be completely dissipated. Accordingly, in order to locate such seeps a series of traverses normal to the prevailing current are conducted, while simultaneously sampling and analyzing, until abnormal concentrations of a preselected gas are detected; and such traverses are continued to determine the area or point of highest concentration which is located above the seep. Obviously, a seep may be located by a series of traverses either by starting at a point directly over the seep and proceeding downcurrent from the seep or starting at a point distant from the seep and proceeding upcurrent toward the seep without affecting the results obtained since the same peculiar distribution of gas-contaminated water will exist and will be shown by plotting the results on a map of the area. Likewise, it is possible to outline a plume of contaminated water by a series of traverses parallel to the prevailing current. However, the chances of missing a seep by operating in this manner are quite high, and it is thus necessary to make each successive traverse much closer to the next preceding traverse. On the other hand, by conducting a series of traverses normal to the prevailing current it has been found that abnormal concentrations of gas can be detected by a series of traverses up to three miles apart. In any event, a major advantage of the present method lies in the ability to systematically survey large areas and locate seeps within such area without prior knowledge of the existence or location of such seeps.

The distance between traverses is, of course, dependent upon the size of the seep (volume of gas evolved from the source per unit of time) to be detected and the "background" or content of a selected indicator gas originating from sources other than hydrocarbon-bearing, subsurface formations. Since methane is the most abundant seep gas dissolved in overlaying waters and analytical apparatus can be more readily sensitized to this component, methane has been selected as the preferred indicator gas in carrying out the present method. Using methane as an indicator, it has been found that the "background" concentrations of methane (for example, from decaying organic matter) are from 0 to 3 parts of methane per million parts of gas separated from the water in an extensive area, such as the Gulf of Mexico, while the background is 10 to 15 parts per million in smaller or more protected bay areas. In any event, these backgrounds are essentially constant. For practical purposes, in a majority of areas total concentrations above five parts per million of methane have been found to be indicative of seeps from subsurface deposits and areas producing shows of this magnitude should be made the subject of detailed surveys. For example, it has been found that gas seeps as small as 0.5 cubic feet per hour can be detected and distinguished from background indications at distances up to one-half mile from the source of the seep, and a seep of 30 cubic feet per hour will produce an indication of about 100 p.p.m., or about 6 times the highest background indication generally encountered, 3,000 feet from the seep source. Accordingly, it has been found that the distance between traverses should preferably be from 500 to 15,000 feet. Occasionally leaking pipe lines, etc., may lead to localized high values but these sources can generally be readily located and the reading obtained can be disregarded. In any event, the preferred procedure should include the step of making at least one spot check in the body of water to be surveyed in order to establish the background. As pointed out above, this background is essentially constant and even extremely small concentrations above the background can be detected and distinguished from the background. Accordingly, shows of more than 0.5 part per million and preferably above 5 parts per million of methane above the methane background are considered positive indicators of seeps.

The position of the surveying vessel, and consequently of a seep, can be located by any known means, such as visual bearing on shore objects, dead reckoning, shoran, etc.

The following detailed description with reference to the drawings will illustrate the best mode contemplated for carrying out the present method together with the details of the preferred apparatus of the present invention.

Water containing dissolved gas is drawn through the degassing section of the apparatus by means of centrifugal pump 10. Through the action of pump 10 the water is drawn through line 12 which is provided with a screen 14 on its inlet end. Screen 14 serves to prevent the entrance of fish and other large objects. The water passes through line 12, equipped with valve 16, and thence to degasser chamber 18 which is preferably tilted at an angle between 5° and 45° from the horizontal. It has been found that best results are obtained when the water is dispersed in degasser chamber 18 by means of a suitable dispersing head 20. Water which has been stripped of dissolved gases in degasser chamber 18 passes out of degasser chamber 18 through line 22, pump 10, and line 24, which is provided with valve 26, and is thereafter discharged back to the sea. Degasser chamber 18 is provided with an upwardly extending section 28 which serves as a gas collecting space for degasser chamber 18. Located within section 28 of degasser chamber 18 is liquid-level controller contact 30 which acts to maintain the proper fluid level in degasser chamber 18. When the level within degasser chamber 18 reaches contact 30 solenoid valve 32 located in line 34 is actuated, thus increasing the volume of water being drawn from degasser chamber 18 and discharged to the sea. Also located in communication with section 28 of degasser chamber 18 is chemical reservoir 36. It has been found that when sea waters are treated in accordance with the instant invention it is normally necessary to add an anti-foam agent, such as silicone type anti-foam agents, to reduce foaming within section 28 of degasser chamber 18. Such anti-foam agent is stored in chemical container 36 and is fed into section 28 of degasser chamber 18, as needed. In lieu of the use of an anti-foam agent the section where foam tends to form may be locally heated or local agitation may be provided. In any event, it is necessary to provide some means of preventing excessive foaming of sea waters. Gases which have been separated from the water in degasser chamber 18 are drawn from section 28 of degasser chamber 18 by means of vacuum pump 38 through line 40. Pump 38 is preferably a diaphragm- or bellows-type pump since it has been found that conventional piston-type pumps result in gas leakage when graphite is employed to lubricate the piston and the gas is contaminated or absorbed when oil is used as a lubricant. Pump 38 is generally operated to produce an absolute pressure slightly greater than the vapor pressure of water in degasser chamber 18 (for example, 27 inches of mercury vacuum), thereby substantially aiding in breaking the gas out of the water. Attached to line 40 between pump 38 and degasser chamber 18 is vacuum gauge 42 which serves to indicate whether pump 38 is operating satisfactorily. Gases passing through pump 38 are discharged from the pump through line 44 at a pressure several ounces above atmospheric. The gases are then passed to centrifugal separator 46. Centrifugal separator 46 performs the function of removing condensed water from the collected gas. Centrifugal separator 46 is provided with a suitable solenoid valve 48 adapted to automatically discharge water collected in centrifugal separator 46. When the water within centrifugal separator 46 rises to electrical contact 50 solenoid valve 48 is actuated to discharge the water. Separated gases which have been freed of condensed water are then passed to drying tube 52 through line 54. Drying tube 52 is provided with a suitable solid absorbent, such as silica gel, anhydrous calcium sulfate, etc., adapted to remove substantially all moisture from the separated gas. Since water vapor is a very strong absorber of infrared light and generally interferes with most methods of gas analysis, it is necessary to remove as much water vapor as possible from the collected gas. The dried gas is then passed to filter 56 through line 58. Filter 56 is adapted to remove solid particles larger than one micron in size from the gas. The dried and filtered gas is then introduced to analyzer 60 through line 62. Following analysis of the gas, it is discharged from the analyzer through line 64 and then passes through flow meter 66, which measures the volume of gas flowing through the analyzer. Gas leaving flow meter 66 is then discharged through line 68 and solenoid valve 70.

In order to provide for a zero check of the analyzer equipment, means are provided for drawing atmospheric air through the analyzer at any desired time, which ordinarily is about once a day. The analyzer is switched from test gas to atmospheric air by actuating vacuum pump 72 and solenoid valves 74 and 76 in line 54 and 70 in line 68. During this operation solenoid valve 74 is opened to discharge test gas and prevent gas build-up in degassing chamber 18. Solenoid valve 76 is opened to draw air through the analyzer and after leaving the analyzer the air is discharged through pump 72. The atmospheric discharge port of solenoid valve 70 is, of course, closed during this operation. Similarly, the atmospheric ports of valves 74 and 76 are closed during normal operation.

Referring now to non-dispersive, infrared analyzer 60 which is shown schematically in Figure 4, this analyzer includes two similar tubes 78 and 80 fitted with windows of a material transparent to infrared radiation. In the particular instance where methane is the indicator gas to be analyzed, tube 78 is divided into two sections 82 and 84. The gas to be analyzed is passed through section 82 of tube 78 and the absorption in the gas specimen tube is compared with the absorption in tube 80 which is filled with dry air. Since gases separated from water contain $CO_2$ and the broad absorption band of $CO_2$ overlaps that for methane, section 84 of tube 78 is filled with $CO_2$ in order to compensate for the $CO_2$ content of the test gas. The energy from hot filament 86 is passed through tubes 78 and 80 and the portion of the energy transmitted through the tubes is received by two measuring chambers 90 and 92, both of which contain a pure sample of the selected indicator gas, in this case methane.

Gas filled chambers 90 and 92 are in pressure connection with one another being separated by a thin diaphragm 94 which forms one electrode of a small electrical condenser. The radiation transmitted through analysis tubes 78 and 80 is absorbed by the pure gas in measuring chambers 90 and 92 causing an increase in temperature, and therefore in pressure; and, when the transmission through the two paths is identical, diaphragm 94, separating measuring chambers 90 and 92, remains stationary. On the other hand, when a sample of gas, which absorbs infrared radiation within the same range as the indicator gas in chambers 90 and 92, is introduced into analysis tube 78, the transmission through the two analysis tubes 78 and 80 becomes unequal and diaphragm 94 undergoes displacement, returning to its normal position when the radiation is cut off.

The displacement of diaphragm 94 produces corresponding changes in the electrical capacitance of the condenser. By applying a polarizing potential to the condenser, these capacitance changes are converted to current changes which are amplified by amplifier 96 to provide an indication which is directly related to the pressure difference between measuring chambers 90 and 92 when receiving radiation. The current from amplifier 96 is then passed to recorder 98 where it operates recording pen 100 which marks continuously moving chart 102 to provide a current v. time record.

In order to make the measurement free from zero drift a rotating vane 104, operated by vane motor 106, interrupts the radiation from filament 86 allowing it to fall simultaneously on chambers 90 and 92 and in turn cutting it off simultaneously. This operation takes place at a low frequency of a few cycles per second allowing pressure changes to be directly related to temperature changes which are themselves related to the difference in absorption of radiation between tube 78 containing the gas to be analyzed and tube 80 containing dry air. In order to make adjustments of zero during zeroing with atmospheric gas, shutter 108 is provided to reduce or increase the light transmitted to tube 80 as required.

In Figure 5, point 110 represents a spot directly above a seep. Line 112 shows the most desirable survey vessel course for locating a seep such as at point 110.

In Figure 6, plot A is for a seep of 1 cubic foot per hour and B is seep of 30 cubic feet per hour.

It is obvious from the foregoing, and particularly from the data presented by Figure 6, that minute concentrations of seep gases may be located in accordance with the present invention. The data recorded on chart 102 of Figure 4 can be readily correlated with the time-location data of the survey vessel and a map of the area outlining and delineating the seeps can be made. It is also apparent that various modifications of individual elements of the apparatus or substitutions of equivalent steps or apparatus elements may be made without departing from the present invention. For example, means for directly recording concentrations on a map of the area may be provided. Other apparati for extracting dissolved gas from water, such as, countercurrent gas liquid extraction columns and the like, and for analyzing the segregated gas may also be employed although it has been found by experiment and actual practice that other known apparati which perform these functions are inferior to the apparati particularly described and in some cases are completely useless.

The present method and apparatus may also be used in connection with various other forms of exploration, as in aid of seismic exploration. It is sometimes necessary in practicing the present invention to differentiate seeps possibly associated with petroliferous deposits from those arising from fairly recent accumulations, such as marsh gas. This may be done in various ways, such as analyzing the collected gases for methane and for hydrocarbons of higher molecular weight than methane, analyzing samples of the collected samples by carbon 14 dating, etc.

We claim:

1. The method of exploration for subterranean petroliferous deposits in water-covered areas comprising, continuously removing samples of water from the area being explored, continuously removing gaseous components from said water samples, continuously subjecting said separated gases to analysis for at least one preselected gas, recording a parameter of the concentrations of said preselected gas, and correlating said recorded parameter with the location from which each incremental water sample was obtained to produce a map of said area.

2. A method in accordance with claim 1, wherein the preselected gas is methane.

3. A method in accordance with claim 2, wherein concentrations of methane in excess of five parts of methane per million parts of separated gas are recorded.

4. A method in accordance with claim 2, wherein a background concentration of methane is established in the area being explored prior to actual exploration and methane concentrations above the sum of said background concentration plus five parts per million are recorded during actual exploration.

5. A method of exploration for subterranean petroliferous deposits in navigable, water-covered areas comprising continuously removing samples of water from the area being explored while passing over said area in a moving vessel, continuously removing gaseous components from said water samples, continuously subjecting said separated gases to analysis for at least one preselected gas, recording a parameter of the concentrations of said preselected gas, and correlating said recorded parameter with the location from which each incremental water sample was obtained to produce a map of said area.

6. The method of exploration for subterranean petroliferous deposits in navigable, water-covered areas comprising piloting a moving vessel over said area in a series of traverses normal to the prevailing current in said area, continuously removing samples of water from said area, continuously removing gaseous components from said water samples, continuously subjecting said separated gases to analysis for at least one preselected gas, recording a parameter of the concentrations of said preselected gas, and correlating said recorded parameter with the location from which each incremental water sample was obtained to produce a map of said area.

7. A method in accordance with claim 6, wherein the traverses are between 500 and 15,000 feet from one another.

8. Apparatus for exploring water-covered areas by locating seeps from subterranean petroliferous deposits comprising, means for continuously extracting samples of water from said area, means for continuously separating gaseous components from said extracted water, analyzer means adapted to continuously analyze said separated gas for at least one preselected gas, means for producing an electrical parameter which is a function of the concentration of said preselected gas, and means for visually recording the magnitude of the changes in said electrical parameter.

9. Apparatus in accordance with claim 8, wherein the analyzing means is a non-dispersive, infrared analyzer.

10. Apparatus in accordance with claim 9, wherein the infrared analyzer is sensitized to methane.

11. Apparatus in accordance with claim 8, wherein the means for continuously separating dissolved gases is a vacuum chamber.

12. Apparatus for removing dissolved gases from water comprising means for collecting a sample of water, a degassing chamber having a gas-collecting zone adjacent its upper end and a water-collecting zone adjacent its lower end, means for introducing said collected sample of water into said water-collecting zone, means for discharging water from said water-collecting zone, means for creating a vacuum in said gas-collecting zone and means for discharging gas from said gas-collecting zone.

13. Apparatus in accordance with claim 12, wherein the means for introducing water into the water-collecting zone includes a dispersing head.

14. Apparatus in accordance with claim 12 which includes means for introducing a chemical into the gas-collecting zone.

15. Apparatus for continuously treating and analyzing gas separated from water comprising means for removing condensed water from said separated gas, means for removing water vapors from said separated gas, analyzer means adapted to analyze said separated gas to determine the concentration of at least one preselected gaseous component, means for producing an electrical parameter which is a direct function of the concentration of said preselected gaseous component, and means for visually recording the magnitude of changes in said electrical parameter.

16. Apparatus in accordance with claim 15 which includes filter means for removing solid particles larger than one micron in size from the separated gas.

17. Apparatus in accordance with claim 15, wherein the analyzer means is a non-dispersive, infrared analyzer.

18. Apparatus in accordance with claim 17, wherein the infrared analyzer is sensitized to methane.

19. Apparatus in accordance with claim 17, wherein the infrared analyzer has an absorption tube filled with carbon dioxide in series with the absorption tube containing the separated gas.

20. Apparatus in accordance with claim 15 which includes zero check means adapted to interrupt the flow of separated gas at a preselected time and to draw atmospheric air through the analyzer.

References Cited in the file of this patent

UNITED STATES PATENTS

| | | |
|---|---|---|
| 2,330,026 | Blau | Sept. 21, 1943 |
| 2,376,366 | Lawlor et al. | May 22, 1945 |
| 2,382,381 | Calvert et al. | Aug. 14, 1945 |
| 2,500,213 | Stephens | Mar. 14, 1950 |
| 2,555,327 | Elliott | June 5, 1951 |
| 2,694,923 | Carpenter | Nov. 23, 1954 |
| 2,767,320 | Coggeshall | Oct. 16, 1956 |